Feb. 8, 1944.                H. C. KRONE ET AL                2,341,449
                     LEAK-PROOF SWIVEL JOINT FOR PIPES
                            Filed March 24, 1942

INVENTORS:
Howard C. Krone & William Meyer,
BY
George D. Richards
ATTORNEY.

Patented Feb. 8, 1944

2,341,449

UNITED STATES PATENT OFFICE 2,341,449

LEAKPROOF SWIVEL JOINT FOR PIPES

Howard C. Krone, River Edge, and William Meyer, East Orange, N. J., assignors to A. W. Wheaton Brass Works, Newark, N. J., a corporation of New Jersey Application March 24, 1942, Serial No. 436,000

2 Claims. (Cl. 285—97.9)

This invention relates, generally, to improvements in leak-proof swivel joints for pipes, conduits and the like for general use to conduct fluids, and especially for use in conducting liquid petroleum products, such as gasoline or the like.

This invention has for an object to provide a novel construction of leak-proof swivel or swing joint for pipe, wherein the meeting members of the joint structure are provided with means for disposing and maintaining the same in a predetermined spaced relation one to the other, and in a definitely maintained relation to a seal means interposed between the seal seating or engaging faces thereof, whereby the leak-proof qualities of the joint are better assured, while at the same time a smooth and easy swiveling action is obtained, free from undue friction or tendency to bind.

The invention has for another object to provide a leakproof swivel or swing joint characterized as above mentioned, wherein the meeting members of the joint structure are directly coupled, one to the other, by a novel mechanical coupling means so cooperative therewith as to firmly and securely hold said members against relative axial play, as well as in definitely maintained swiveling contact with an interposed internal pressure responsive seal means.

Other objects of this invention, not at this time more particularly enumerated, will be understood from the following detailed description of the same.

An illustrative embodiment of this invention is shown in the accompanying drawing, in which.

Similar characters of reference are employed in the above described views, to indicate corresponding parts.

Figure 1:
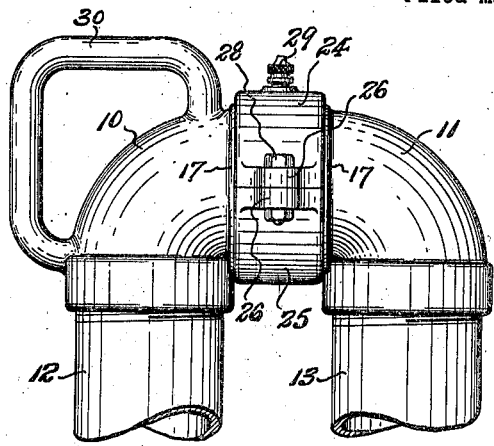
Fig. 1 is a side elevation.
Figure 5:
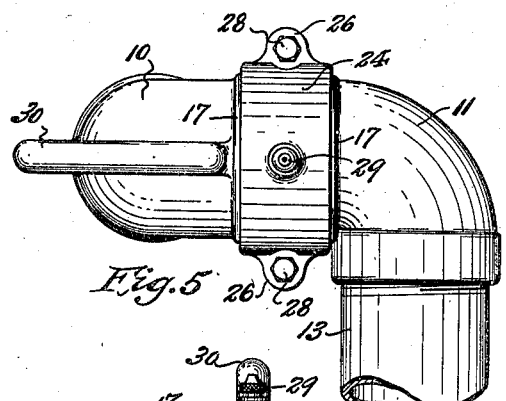
Fig. 5 is a top plan view, similar to that of Fig. 2, but showing one joint member angularly displaced or turned relative to the other.
Figure 2:
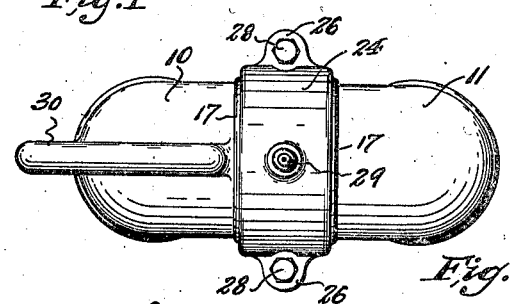
Fig. 2 is a top plan view.
Figure 3:
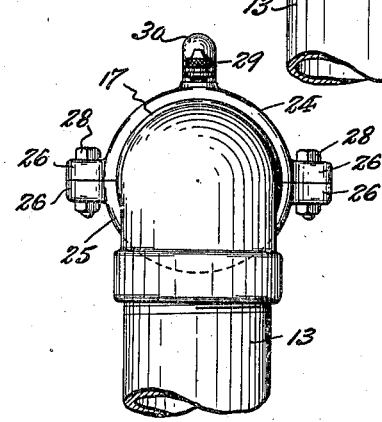
Fig. 3 is an end elevation of a swivel pipe joint structure according to this invention.
Figure 4:
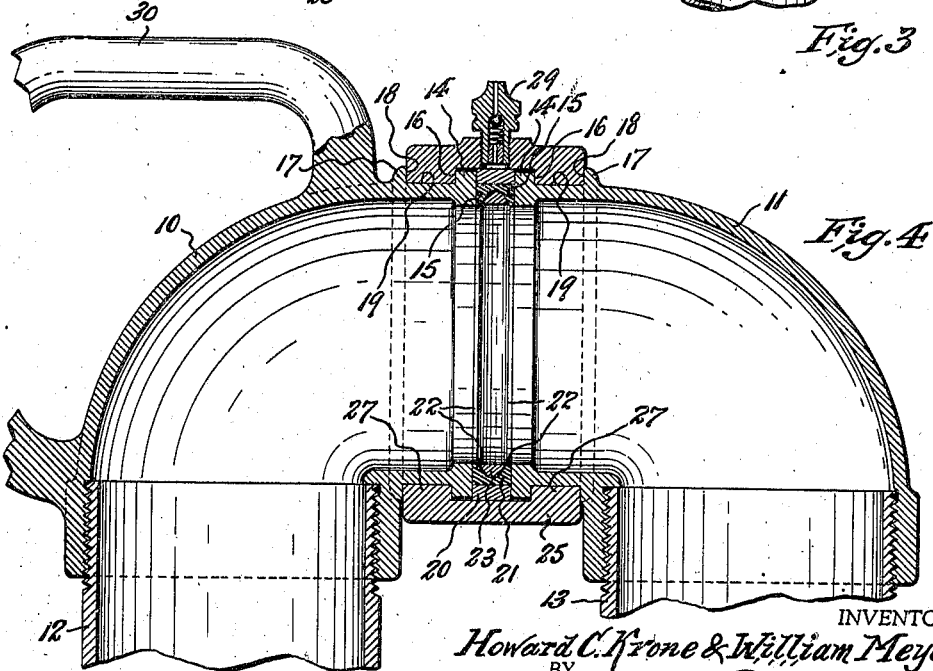
Fig. 4 is a longitudinal sectional view of the swivel pipe joint structure, drawn on an enlarged scale.

For the purposes of illustration, the swivel joint structure of this invention is shown as of U-shape form, comprising opposed meeting members 10 and 11 of elbow type, but it will be understood that said meeting members may, if desired, be of any other than elbow shape, or one may be straight and the other of elbow shape, accordingly as best adapted for any given use.

The exterior ends of the meeting members 10 and 11 are respectively adapted to receive attachment thereto of the pipe or conduit members 12 and 13, which may be threaded thereinto, or otherwise suitably connected and secured thereto.

The interior or meeting ends of the members 10 and 11 are opposed in axial alignment, and each terminates in an annular end flange 14, the external transverse face 15 of which provides a seal engageable surface or seat. The rearward side of the exteriorly projecting part of each end flange 14 provides a rearwardly facing shoulder 16. Each member 10 and 11 is further provided with an external annular rib 17, the forward side of which provides a forwardly facing shoulder 18, spaced rearwardly from said shoulder 16 of the end flange 14, whereby said shoulders 16 and 18 define an intermediate annular channel 19, for purposes presently to be explained.

When the meeting members 10 and 11 are operatively assembled, with their end flanges 14 opposed, a suitable seal means is interposed between the seal engageable surfaces or seats provided by the external transverse faces 15 of said end flanges. The seal means may be of any suitable selected form and construction; preferably, however, it is, as shown, of a type adapted to respond to and laterally expand under the internally applied pressure of fluid caused to flow through the joint structure. A desirable form of such pressure responsive seal means comprises an outer rigid holder ring 20, which embraces and holds a resilient annular seal member 21. Said seal member 21 is provided in its internal surface with an annular channel or groove calculated to so cross-sectionally shape the seal body as to provide the same, along the marginal portions of its opposite sides, with flexible lips 22, which respectively lie contiguous to the adjacent surfaces or seats provided by the external transverse faces 15 of the end flanges 14 of the respective joint members 10 and 11. Engaged in the channel or groove of the seal member 21 is an annular keeper ring 23, which serves to retain the seal member against inward radial displacement.

The means for coupling the meeting members 10 and 11 of the joint structure, whereby to hold the same firmly and securely against relative axial play, as well as in definitely maintained swiveling relation to each other and in swiveling contact with the interposed seal means, comprises a diametrically split coupling collar composed of separable semi-circular collar members 24 and 25, each having, adjacent their respective ends, outwardly or radially projecting perforate ears or lugs 26, so disposed that those of one collar member will lie in opposed aligned relation to those of the other collar member, when said collar members are applied to and around the meeting members 10 and 11 of the joint structure. The collar members are provided with laterally spaced internal annular coupler tenons 27, which, when said collar members are brought together in surrounding and embracing relation to the meeting members 10 and 11 and the seal means interposed therebetween, respectively engage in the annular channels 19 of the respective meeting members, so as to be abutted on opposite sides by the shoulders 16 and 18 which define said channels 19; in other words said coupler tenons 27 correspond in width to the width of a channel 19, so as to snugly fit into the latter without tendency to lateral movement or play therein. After the collar members 24 and 25 are thus operatively applied to the meeting members 10 and 11 of the joint structure, and likewise operatively assembled together in coupling collar relation, the same are firmly and securely united by fastening forming bolts 28, which are engaged through cooperating perforate ears or lugs 26 thereof. The coupling tenons 27 are spaced apart at a predetermined fixed distance, which will correspond to the combined width of the end flanges 14 and interposed seal means, whereby the latter will be slidingly engaged by the seat forming faces 15 of said end flanges.

It will be obvious that the meeting end members 10—11 as thus coupled together by the described coupling means, will be free to rotate in relation one to the other and relative to the interposed seal means, and yet said members will be securely and firmly held against axial movement or play. As a consequence of this, the rotative movements of the members 10—11 will be guided for smooth and easy action without undue friction or tendency to stick or bind, while at the same time said members will be held in such definite and predetermined relation to the interposed seal means that, under pressure of the fluid passing through the joint, the lips 22 of the seal member 21 are efficiently expanded, and thus tightly pressed with exceedingly efficient sealing effect against the relatively unyieldable seating faces 15 of the end flanges 14 of said members 10 and 11.

Mounted on and through the coupling collar 24—25 is a lubricant admission means 29, preferably of the type to receive application of a grease-gun. Lubricant may be delivered through the admission means 29, so as to internally lubricate the relatively moving parts of the joint structure, whereby to assure easy movement thereof with a minimum of frictional resistance.

When the joint structure of this invention is used to unite articulated pipe or conduit means, members of which are permitted to swing in company as well as in relation one to another, as, e. g., when used to join a swingable delivery pipe and a drop or discharge pipe of a loading conduit system, one of the meeting members of the joint structure, e. g., the member 10, may be provided with a hand grip or loop 30, as shown, to facilitate manipulation of the joined pipe or conduit sections.

We are aware that changes could be made in the devices and parts making up the joint structure, and that many apparently widely different embodiments of the features of this invention could be made without departing from the scope thereof as defined in the following claims. It is therefore intended that all matter contained in the above description or shown in the accompanying drawing shall be interpreted as illustrative and not in a limiting sense.

We claim:

1. A leak-proof swivel joint for pipe comprising a pair of opposed joint members terminating in spaced apart transverse end faces to provide seal means engageable surfaces, an internal fluid pressure responsive seal means interposed between said surfaces, said seal means comprising a rigid external holder ring the sides of which are slidably abutted by said end faces of said opposed joint members, a resilient annular seal member circumferentially surrounded and backed by said holder ring, said seal member having a channeled interior circumferential face to provide flexible lips along its respective sides adapted to be pressed against adjacent end face surfaces of said opposed joint members by internal fluid pressure, each joint member having an externally projecting annular flange flush with its end face surface and a second externally projecting annular flange spaced inwardly therefrom, the thus spaced flanges providing an outwardly open annular channel therebetween, a coupling collar means to straddle the opposed joint member end portions in surrounding relation thereto, said coupling collar means having laterally spaced internal coupling tenons each of a width to respectively snugly fit into said channels so as to be slidingly engaged by the respective joint members whereby to hold the latter against relative axial movement while at the same time guiding relative rotative movements thereof, and said coupling collar means comprising separable sections having cooperative means for securing the same together about said joint member end portions.

2. In a leak-proof swivel joint for pipe as defined in claim 1 wherein at least one of said coupling collar sections is provided with a check-valved lubricant admission means for delivering a lubricant to the relatively moving parts of the joint structure.

HOWARD C. KRONE.
WILLIAM MEYER.